Nov. 15, 1932. H. L. PARR 1,887,781
METHOD AND APPARATUS FOR REMOVING SEDIMENT FROM AUTOMOBILE COOLING SYSTEMS
Filed Sept. 6, 1930
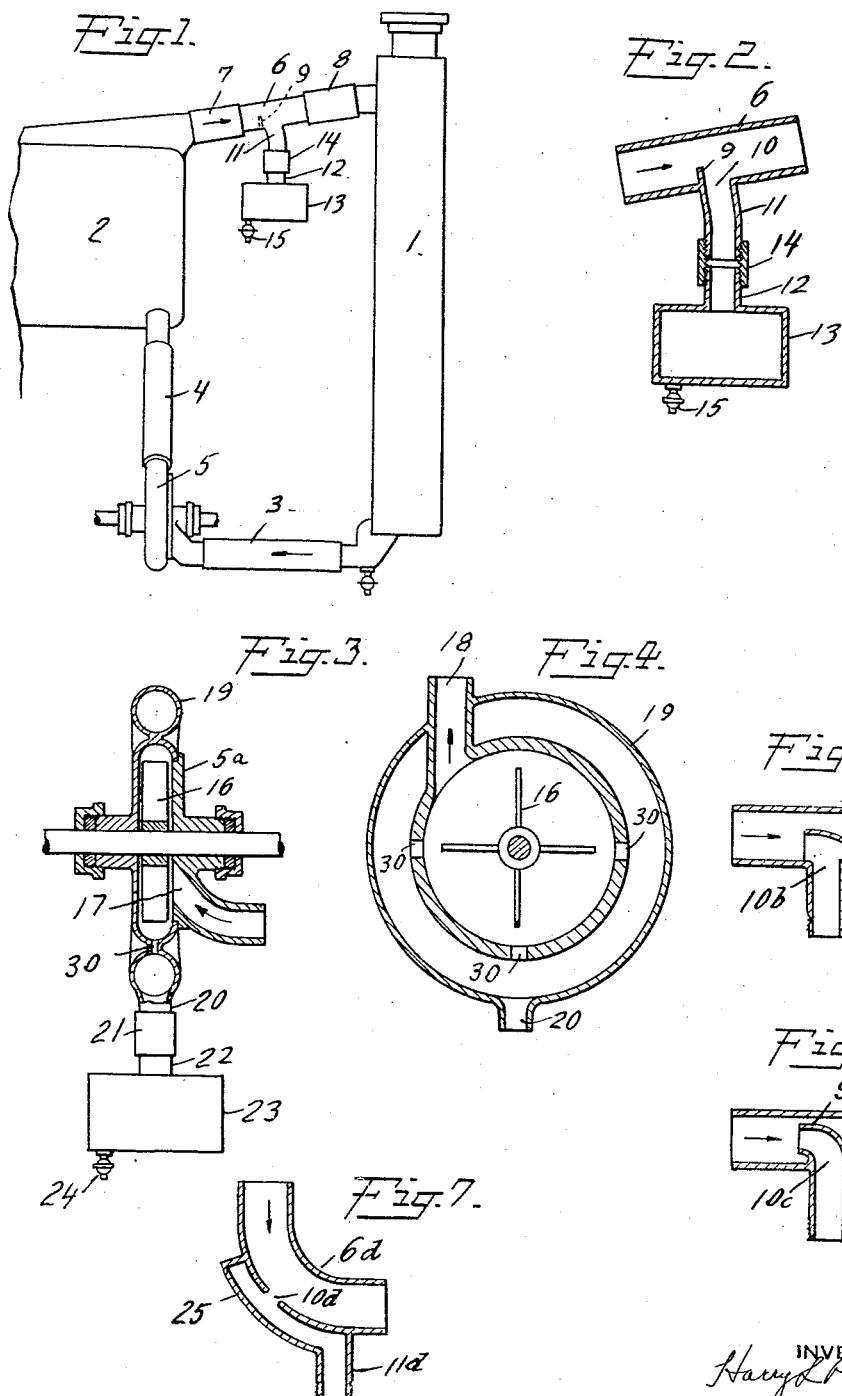
INVENTOR
Harry L. Parr
BY
Pennie, Davis, Marvin & Edmonds
ATTORNEYS Patented Nov. 15, 1932

1,887,781

UNITED STATES PATENT OFFICE

HARRY L. PARR, OF YONKERS, NEW YORK, ASSIGNOR, BY MESNE ASSIGNMENTS, TO AUTOMOTIVE ACCESSORIES COMPANY, OF DETROIT, MICHIGAN, A CORPORATION OF MICHIGAN

METHOD AND APPARATUS FOR REMOVING SEDIMENT FROM AUTOMOBILE COOLING SYSTEMS

Application filed September 6, 1930. Serial No. 480,071.

This invention relates to an improved method and apparatus for the removal of sediment or particles in suspension from the circulating cooling water of internal combustion engines.

In the water cooling systems of automobile engines the water is continuously and repeatedly circulated through the jackets of the engine and through the radiator, during the operation of the engine. Sediment accumulates in the cooling water due to such causes as the rusting of the metal by the circulating water, and the concentration of impurities introduced in solution in the water as the water evaporates and additional water is added. The sediment problem is particularly pronounced where water containing substantial amounts of dissolved salts is employed, which salts are thrown out of solution by heating, or which are concentrated in solution as the water evaporates and additional water is added. The accumulation of sediment is a gradual and progressive operation and, unless the sediment is more or less frequently removed by flushing the system, may increase to such an extent as to interfere with the effective cooling of the engine by the circulating water.

The present invention provides an improved method and apparatus for the removal of such sediment, in a gradual and progressive manner, as the water is being circulated in the system.

According to the present invention a quiet zone of water is provided, outside the circulating system, but communicating therewith through a restricted opening, and the restricted opening is so situated that sediment particles being circulated through the circulating system will enter the restricted opening and the quiet zone and be there collected. In order to promote the entrance of sediment particles into the restricted opening and the quiet settling zone, I so connect the restricted opening with the circulating system that the inertia of the sediment particles is utilized to deflect them into the restricted opening. This can advantageously be accomplished by placing an obstruction in the path of the flowing water or by abruptly changing the area of the conduit through which water is flowing, so that eddy currents are produced adjacent the opening to the quiet zone. The quiet zone is maintained without circulation of the liquid into and out of this zone, but the passage of the liquid over the restricted opening, together with the eddying or slowing of the velocity of the liquid adjacent the opening, are relied upon to promote the settling out of sediment particles by gravity.

The present invention can readily be embodied in existing circulating systems of automobiles, for example, by interposing in the circulating stream a pipe having a baffle or obstruction therein which will deflect the flow and cause eddying, and by providing a restricted opening into the pipe adjacent the baffle and a container communicating therewith and forming a settling zone.

The invention will be further described in connection with the accompanying drawing, which shows in a somewhat conventional and diagrammatic manner, apparatus embodying the invention and adapted for the practice of the process of the invention, but it is intended and will be understood that the invention is illustrated thereby but is not limited thereto.

In the accompanying drawing, Fig. 1 shows, in a conventional and diagrammatic manner, the circulating system of an automobile engine with the invention embodied therein;

Fig. 2 is an enlarged vertical sectional view showing the connection of the sediment removing apparatus in the system;

Fig. 3 shows a modified arrangement, the view being partly in section and partly in elevation;

Fig. 4 is a transverse vertical section at right angles to that of Fig. 3; and

Figs. 5, 6 and 7 show modified forms of apparatus.

Referring first to Figs. 1 and 2, it will be noted that Fig. 1 shows conventionally the circulating cooling system of an automobile, the circulation being through the radiator 1 and the jackets of the engine 2 by means of connecting piping, the piping connecting the bottom of the radiator with the jackets being indicated conventionally as 3 and 4 with the pump 5 for bringing about circulation of the cooling medium from the bottom of the radiator to the jackets, and from the jackets to the top of the radiator. The connection at the top of the radiator with the engine jackets is through a connecting pipe which includes the pipe 6 connected to adjacent pipes by suitable hose connections or other connections 7 and 8, the arrangement being such that the pipe 6 can readily be detached and attached, being adapted to replace, for example, a part of the ordinary hose connection.

The pipe 6 has a baffle 9 therein extending across the bottom of the pipe and immediately adjacent the baffle is the opening 10 and a downwardly extending pipe nipple 11, which in turn is connected to the coupling 14 with a similar nipple 12 on the receptacle 13. The sediment receptacle 13 has a pet-cock 15 at the bottom for draining it to remove sediment if the sediment is in suspended form, while if the sediment forms a solid cake in the bottom of the receptacle 13, this receptacle can be detached by means of the coupling 14 and cleaned out or replaced with a new receptacle.

The arrangement of the apparatus shown in Figs. 1 and 2 is such that, as the water is circulated by the pump through the engine jackets and the radiator, there will be an abrupt change in velocity due to the baffle 9 which will cause eddying immediately beyond the baffle on the downstream side thereof and this eddying will take place immediately above the restricted opening 10 in the pipe 11. The result of this abrupt change in velocity and eddying will be to permit some of the sediment to drop out of the circulating liquid into the dead body of liquid contained in the pipe 11 and receptacle 13. Even though the sediment settles out only slowly, the continued settling out of sediment will gradually and progressively remove sediment from the circulating liquid and collect it in the receptacle 13. Accordingly, instead of attempting to purify the full stream of circulating liquid, only a small part is acted upon at one time and purified by removing some of the sediment therefrom, but the purification of the entire body of cooling liquid thus takes place gradually and progressively. The sediment collecting in the receptacle 13 can be flushed therefrom through the petcock 15, or, if necessary, the receptacle 13 can be detached and cleaned out and then again attached.

The modification shown in Figs. 3 and 4 is one in which the collection of sediment takes place in connection with the operation of the pump. The pump is shown as a centrifugal or rotary pump 5a with impellers 16 and with inlet 17 and discharge pipe 18. Surrounding the pump casing is an annular chamber or outer casing 19 connected with the pump chamber by a plurality of restricted openings 30. This outer casing has a lower outlet nipple 20 connected by coupling 21 with a connection 22 leading to a sediment receptacle 23 with drain cock 24 thereon. The quiet zone in this case is the space surrounding the pump chamber and which connects therewith only through the restricted openings 30 and the receptacle 23. With this construction, the water entering the pump housing is acted upon by the impeller which imparts a rotary motion thereto, and this rotary motion subjects the water and the particles of foreign matter carried thereby to the action of centrifugal force. This centrifugal force acting on the particles of foreign material, which are of greater specific gravity than the water, throws such particles to the periphery of the pump chamber where they are swept along until discharged through the openings 30 into the quiet zone within the outer casing 19, and from which they settle down through the nipples 20 and 22 into the receptacle 23. The size and shape of the openings 30 may, of course, be varied according to the desire of the particular designer and to the requirements of the particular installation.

In Figs. 5, 6 and 7, the modified forms of pipes 6b, 6d, and 6e are intended for use in the circulating system much as the pipe 6 is employed in Fig. 1, the pipes of Figs. 5 and 6 being adapted to replace the pipe 6 of Fig. 1, while the pipe 6d of Fig. 7 should be arranged at an angle in the circulating system.

In Fig. 5, the pipe 6b is provided with a hood 9b in the form of a scoop, opening against the direction of flow of the water in the pipe 6b, and positioned over the opening 10b leading into the nipple 11b to which a sediment receptacle is adapted to be attached. With this construction the flow of all the water in the pipe 6b is around the hood 9b, but in passing over the hood 9b its direction of flow is changed more rapidly than that of the particles of foreign material carried by it, and which, by inertia, are swept under the hood where they find their way into the opening 10b and nipple 11b.

In the arrangement of Fig. 6, there is a similar tendency for suspended particles to be carried into the opening in the pipe 9c and thence into the quiet zone formed in the pipe 11c.

In Fig. 7, the pipe 6b is of arcuate shape and the opening from the pipe into the quiet zone is arranged at the outside as indicated at 10c and leads to the quiet zone formed by the outer casing 25 and the pipe 11d. The change of direction of the liquid in this pipe 6b and the centrifugal action which tends to throw particles of sediment toward the outside, promotes the separating of suspended particles so that they pass into the quiet zone to be there removed.

In Figs. 3 to 7, the parts corresponding to the parts of Figs. 1 and 2 are indicated with the same reference numerals with letters appended thereto.

In all of the modifications illustrated, there is a quiet zone in which settling of sediment takes place, which quiet zone is connected through a restricted opening or openings to the circulating stream of cooling liquid, and the arrangement is such that suspended particles carried in the liquid are caused to pass into the quiet zone and there diverted, without diverting a corresponding amount of the liquid, that is, the liquid must be kept in circulation and there is no opportunity for it to escape through the quiet zone and into the settling chamber, while the sediment particles which are caused to move from the circulating liquid into the quiet zone are there removed from the circulating liquid.

Variations and modifications can be made in the invention as illustrated and described without departing from its spirit and scope.

I claim:

1. An apparatus for removing sediment from the circulating cooling liquid of the cooling system of an internal combustion engine comprising a pipe section of substantially uniform diameter adapted to be inserted in the circulating line of the cooling system, a pipe extension extending downwardly therefrom, a receptacle connected thereto and providing a quiet zone, and a baffle arranged on the down stream side of the extension in said first mentioned pipe to promote eddying of the liquid and separation of suspended particles from the circulating liquid into said downwardly extending pipe.

2. A sediment removing device adapted to be inserted in the circulating line of the cooling system of an internal combustion engine comprising a pipe section of substantially uniform diameter, a downwardly extending pipe connection providing a downwardly extending opening, a receptacle connected thereto and adapted to form a sediment receptacle, and means comprising a baffle for completely closing the lower portion of the pipe section while leaving the upper portion unobstructed adjacent said downwardly extending pipe to promote the removal of sediment from the circulating liquid into said pipe and receptacle without the circulation of liquid through said receptacle.

3. An apparatus for removing sediment from cooling systems of automobile engines comprising a pipe section interconnecting the automobile engine radiator and the engine and having an opening therein and an impermeable baffle curved up stream over the opening, and providing a pocket of quiet liquid above the opening there being no appreciable flow of liquid through the opening.

In testimony whereof I affix my signature.

HARRY L. PARR.